US012670840B2

(12) United States Patent
Akiba

(10) Patent No.: US 12,670,840 B2
(45) Date of Patent: Jun. 30, 2026

(54) CIRCUIT APPARATUS AND DISPLAY SYSTEM

(71) Applicant: SEIKO EPSON CORPORATION, Tokyo (JP)

(72) Inventor: Yasutoshi Akiba, Chino (JP)

(73) Assignee: SEIKO EPSON CORPORATION (JP)

( * ) Notice: Subject to any disclaimer, the term of this patent is extended or adjusted under 35 U.S.C. 154(b) by 0 days.

(21) Appl. No.: 19/001,852

(22) Filed: Dec. 26, 2024

(65) Prior Publication Data

US 2025/0218342 A1 Jul. 3, 2025

(30) Foreign Application Priority Data

Dec. 27, 2023 (JP) ................................. 2023-220250

(51) Int. Cl.
*G09G 3/20* (2006.01)

(52) U.S. Cl.
CPC ....... *G09G 3/2096* (2013.01); *G09G 2310/08* (2013.01); *G09G 2340/0435* (2013.01)

(58) Field of Classification Search
CPC ............. G09G 3/2096; G09G 2310/08; G09G 2340/0435; G09G 2380/10; G09G 5/12; G09G 5/18; G09G 5/005
See application file for complete search history.

(56) References Cited

U.S. PATENT DOCUMENTS

2008/0036748 A1 2/2008 Lees
2009/0195675 A1* 8/2009 Haneda ................ H04N 23/667 348/240.99
2016/0379584 A1* 12/2016 Onishi ................. G09G 3/3648 345/691
2020/0357357 A1* 11/2020 Yamagishi ............. G09G 5/391

FOREIGN PATENT DOCUMENTS

JP 2004-222033 A 8/2004
JP 2009117896 A * 5/2009 ............. H04N 7/152
JP 2016-187079 A 10/2016

* cited by examiner

*Primary Examiner* — Towfiq Elahi
(74) *Attorney, Agent, or Firm* — Harness, Dickey & Pierce, P.L.C.

(57) ABSTRACT

A selection circuit selects any of internal image data or input image data and outputs selected image data. An output circuit outputs output image data based on the selected image data. A control circuit controls an internal image data output circuit to output the internal image data at a frame rate different from that of the input image data in a switching period from the internal image data to the input image data. The control circuit controls the selection circuit to switch from the internal image data to the input image data in an overlap period between a vertical blanking period of the internal image data and a vertical blanking period of the input image data.

12 Claims, 10 Drawing Sheets

CIRCUIT APPARATUS AND DISPLAY SYSTEM

The present application is based on, and claims priority from JP Application Serial Number 2023-220250, filed Dec. 27, 2023, the disclosure of which is hereby incorporated by reference herein in its entirety.

BACKGROUND

1. Technical Field

The present disclosure relates to a circuit apparatus, a display system, and the like.

2. Related Art

JP-A-2016-187079 discloses a display system including a switching circuit for switching an asynchronous video signal. The switching circuit outputs a video signal synchronized with a vertical synchronization signal VS3 in a certain period after power is turned on, and outputs a synthesized video signal synchronized with a vertical synchronization signal VS4 after a switching signal is switched.

In JP-A-2016-187079, since the vertical synchronization signal VS3 and the vertical synchronization signal VS4 are not synchronized, there is a problem that synchronization continuity is compromised at the time of switching the video signal. That is, there is no synchronization continuity between a last synchronization timing of the vertical synchronization signal VS3 before switching and a first synchronization timing of the vertical synchronization signal VS4 after switching. In a display apparatus that receives image data without synchronization continuity, synchronization is unstable and an image is distorted, or a measure is implemented such as displaying black in a period in which there is no synchronization continuity, which may lead to low display visual quality.

SUMMARY

An aspect of the disclosure relates to a circuit apparatus including: an internal image data output circuit configured to output internal image data; an input circuit configured to receive input image data; a selection circuit configured to select any of the internal image data and the input image data, and output selected image data; an output circuit configured to output output image data based on the selected image data; and a control circuit, in which the control circuit controls the internal image data output circuit to output the internal image data at a frame rate different from a frame rate of the input image data in a switching period from the internal image data to the input image data, and controls the selection circuit to switch from the internal image data to the input image data in an overlap period between a vertical blanking period of the internal image data and a vertical blanking period of the input image data.

Another aspect of the disclosure relates to a display system including: the above-described circuit apparatus; and a display apparatus configured to display an image based on the output image data.

DESCRIPTION OF EMBODIMENTS

A preferred embodiment of the disclosure will be described in detail below. The embodiment described below does not unduly limit the content described in the claims. Not all of configurations described in the embodiment are essential constituent elements.

1. Electronic Device and Display System

Figure 1:
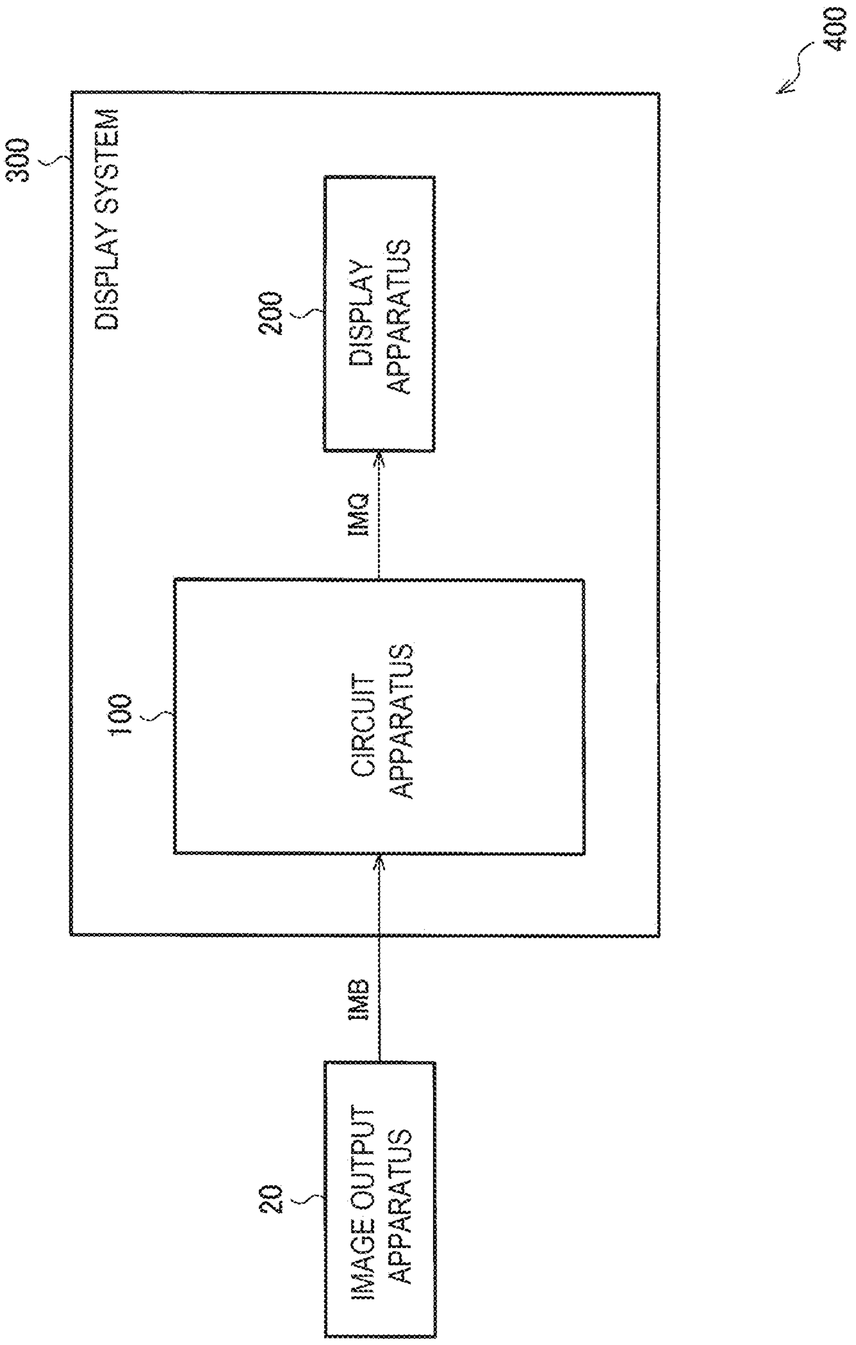
FIG. 1 is a configuration example of an electronic device and a display system.

FIG. 1 is a configuration example of an electronic device and a display system. An electronic device 400 includes an image output apparatus 20 and a display system 300. The display system 300 includes a circuit apparatus 100 and a display apparatus 200.

The image output apparatus 20 is an apparatus that transmits input image data IMB to the circuit apparatus 100. Examples of such an apparatus include a camera, a relay, a splitter, and a microprocessor. The camera captures an image and transmits image data thereof. The relay is an apparatus that buffers received image data and the like. The splitter is an apparatus that divides and transmits received image data. The microprocessor transmits image data read from a memory, for example, or performs image processing on image data read from the memory or received from outside and transmits the image data.

The circuit apparatus 100 acquires internal image data inside the circuit apparatus 100, receives the input image data IMB from the image output apparatus 20, and switches between the internal image data and the input image data IMB to output output image data IMQ. The circuit apparatus 100 is, for example, an integrated circuit apparatus in which a plurality of circuit elements are integrated at a semiconductor substrate. The circuit apparatus 100 is, for example, a dedicated IC for video switching, an IC that performs overlay in addition to video switching, or an IC incorporating a function of a display controller in addition to video switching.

The display apparatus 200 receives the output image data IMQ and displays an image corresponding to the output image data IMQ. The display apparatus 200 is, for example, an in-vehicle display apparatus such as a head-up display, a center information display, a cluster panel, a navigation system, or an electronic mirror. Alternatively, the display apparatus 200 may be a television apparatus or a monitor of an information processing terminal. The display apparatus 200 includes a display panel and a display driver that drives the display panel. When the display apparatus 200 is a head-up display, the display apparatus 200 may include a projection optical system that projects an image to be displayed on the display panel and a projection light source.

For example, the electronic device 400 is an in-vehicle device, the internal image data is image data for displaying a brand logo of an automobile or a device, and the image output apparatus 20 is an SoC that outputs a navigation image. The display apparatus 200 is a head-up display, a center information display, or the like that displays information for a passenger. At this time, at the time of startup of the in-vehicle device, the circuit apparatus 100 may output the brand logo or the like during a predetermined time after the startup and may switch from the brand logo or the like to the navigation image, a meter display, or the like after the predetermined time elapses.

2. Circuit Apparatus

Figure 2:
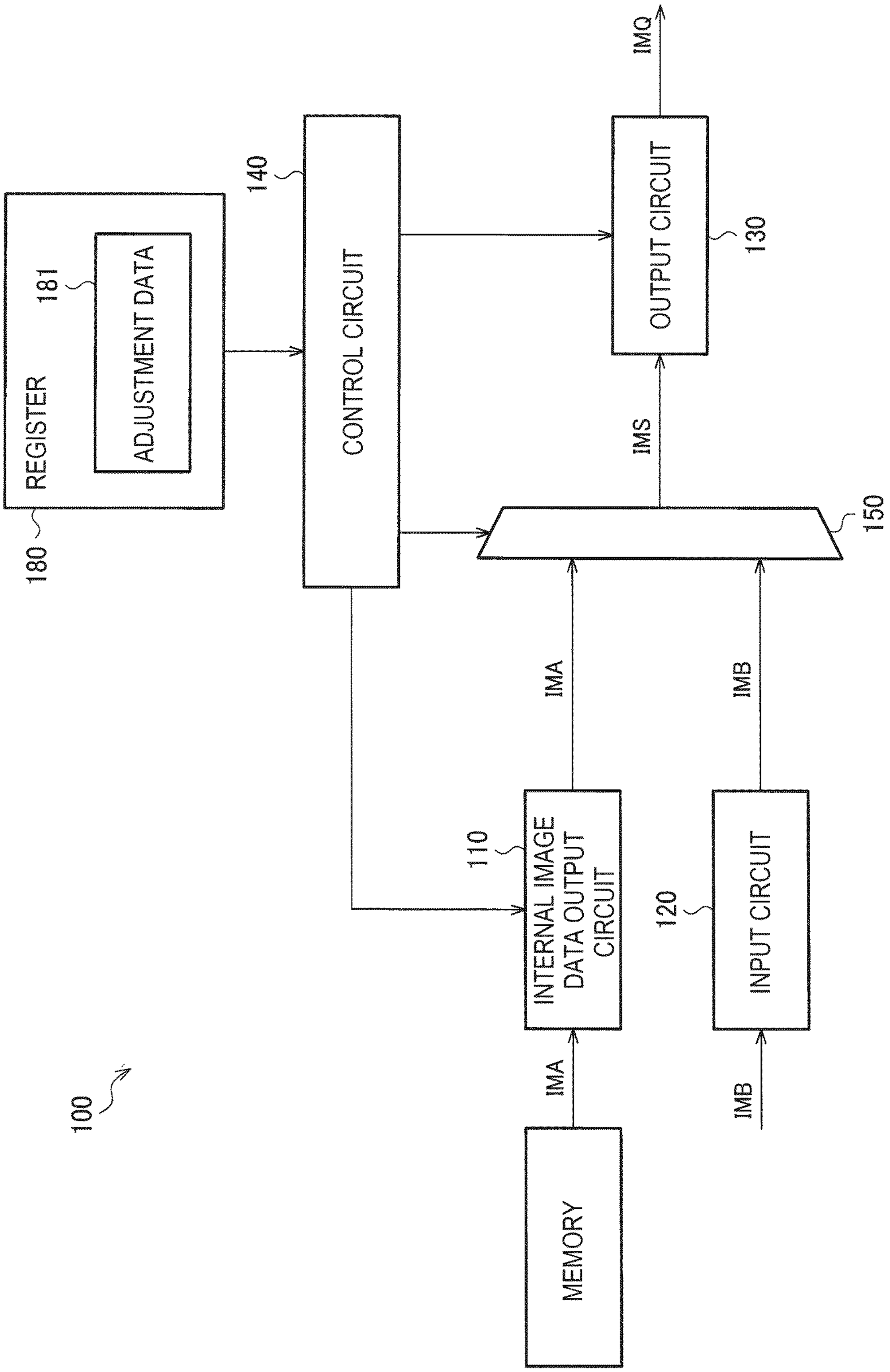
FIG. 2 shows a configuration example of a circuit apparatus.

FIG. 2 shows a configuration example of the circuit apparatus. The circuit apparatus 100 includes an internal image data output circuit 190, a memory 195, an input circuit 120, an output circuit 130, a control circuit 140, a selection circuit 150, and a register 180.

The memory 195 stores internal image data IMA. The memory 195 may be a non-volatile memory such as an EEPROM or an OTP memory, or may be a volatile memory such as a SRAM or a DRAM. The EEPROM is an abbreviation for an electrically erasable programmable read-only memory. The OTP is an abbreviation for one-time programmable. The SRAM is an abbreviation for a static random access memory. The DRAM is an abbreviation for a dynamic random access memory.

The internal image data output circuit 190 reads the internal image data IMA from the memory 195 and outputs the internal image data IMA at a frame rate set from the control circuit 140. Specifically, the internal image data output circuit 190 generates a timing control signal based on timing control information set from the control circuit 140 and outputs the internal image data IMA together with the timing control signal. The timing control signal includes, for example, dot a clock, a horizontal synchronization signal, and a vertical synchronization signal. Hereinafter, simply referred to as the internal image data IMA, including the timing control signal. The same applies to the input image data IMB and the output image data IMQ.

The internal image data output circuit 190 adjusts the frame rate in the internal image data output circuit 190 such that the internal image data IMA and the input image data IMB are switched in a vertical blanking period during switching between the internal image data IMA and the input image data IMB. Such frame rate adjustment will be described later with reference to FIG. 4.

The input circuit 120 is an image interface circuit, receives the input image data IMB, and converts the received input image data IMB into a format used inside the circuit apparatus 100. The internal image data IMA and the input image data IMB are asynchronous with each other. Being asynchronous means that timing control signals are not synchronized with each other, and for example, synchronization timings of vertical synchronization signals are independent of each other, or frame rates are different. An image interface standard may be various, such as a standard where image data and a timing control signal are transmitted and received as separate signals, a standard where all or a part of timing control signals are embedded in image data, a standard where a timing control signal is demodulated from image data, and a standard where image data and a timing control signal are transmitted and received via packet communication. The image interface standard is, for example, Open LVDS Display Interface, DisplayPort, or Mobile Industry Processor Interface Display Serial Interface 2. The image data format used inside the circuit apparatus 100 may be various as described above, and one example is a format where RGB image data and a timing control signal are transmitted as separate signals.

Figure 4:
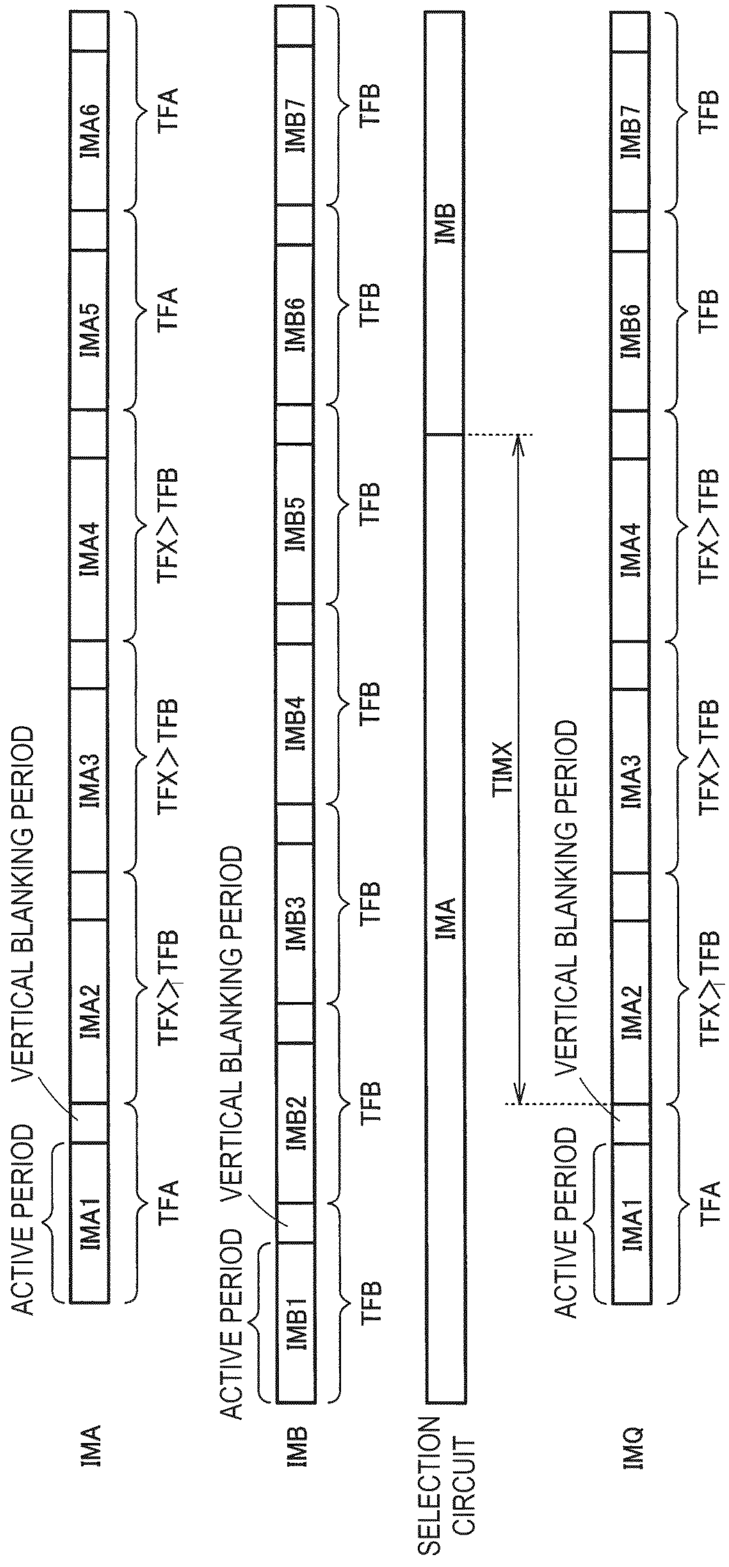
FIG. 4 is a timing chart showing an operation of the circuit apparatus.

The selection circuit 150 selects any of the internal image data IMA and the input image data IMB, and outputs the selected image data as selected image data IMS. Hereinafter, a case where the selection circuit 150 switches from the internal image data IMA to the input image data IMB will be mainly described, and the selection circuit 150 may also switch from the input image data IMB to the internal image data IMA. In the latter case, frame rate adjustment and switching in a vertical blanking period to be described later with reference to FIG. 4 are the same.

The output circuit 130 outputs the output image data IMQ based on the selected image data IMS. The selected image data IMS is the internal image data IMA whose frame rate is not adjusted, the internal image data IMA whose frame rate is adjusted, or the input image data IMB. The output circuit 130 does not change a frame rate of such an image, and outputs the image as the output image data IMQ.

The register 180 stores adjustment data 181 for adjusting the frame rate of the internal image data IMA. For example, an external processing apparatus of the circuit apparatus 100 writes the adjustment data 181 to the register 180 via an interface circuit (not shown). Alternatively, the circuit apparatus 100 may include a non-volatile memory (not shown) that stores the adjustment data 181, and the adjustment data 181 may be loaded from the non-volatile memory to the register 180.

The control circuit 140 controls the internal image data output circuit 190, the selection circuit 150, and the output circuit 130 based on the adjustment data 181 stored in the register 180. Specifically, the control circuit 140 controls, based on a frame rate indicated in the adjustment data 181, frame rate adjustment by the internal image data output circuit 190, a selection timing of image data by the selection circuit 150, and synchronization signal generation of the output image data IMQ by the output circuit 130.

The adjustment data 181 is data indicating at least one of a vertical blanking period and a horizontal blanking period. The internal image data output circuit 190 generates, based on control from the control circuit 140, a horizontal synchronization signal and a vertical synchronization signal of the internal image data IMA to have the blanking period indicated in the adjustment data 181. By changing the blanking period, the total number of pixels in a frame is changed, and thus the frame rate of the internal image data IMA is changed. The adjustment data 181 may be data indicating the blanking period, or may be data indicating an additional period to the blanking period of the internal image data IMA whose frame rate is not adjusted. Specific examples of how the blanking period is changed will be described with reference to FIG. 5 and the subsequent drawings.

Figure 3:
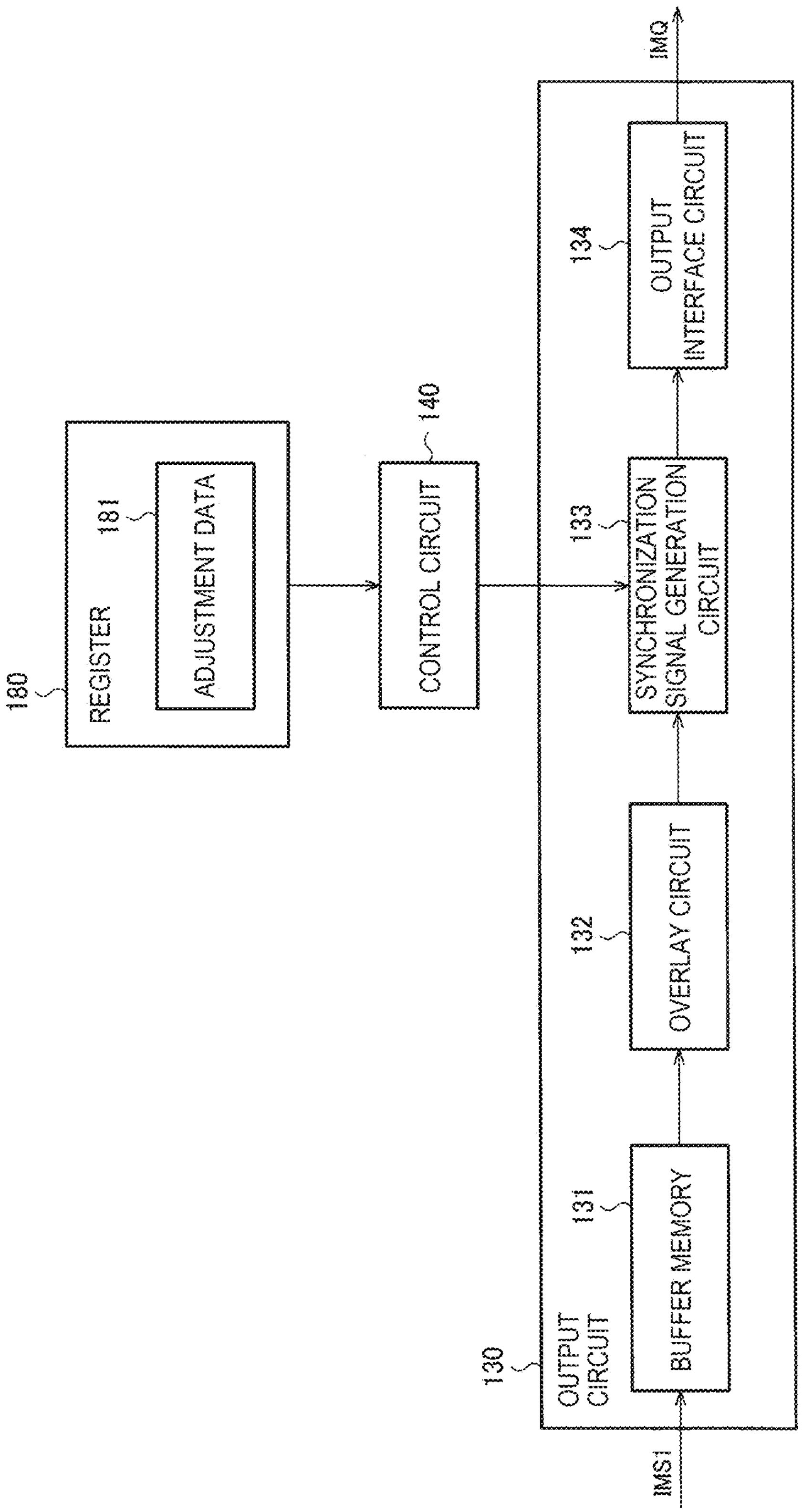
FIG. 3 shows a detailed configuration example of an output circuit.

FIG. 3 shows a detailed configuration example of the output circuit. The output circuit 130 includes a buffer memory 131, an overlay circuit 135, a synchronization signal generation circuit 133, and an output interface circuit 134. The configuration of the output circuit 130 is not limited to that in FIG. 3, and for example, the overlay circuit 135 may be omitted.

The buffer memory 131 buffers the selected image data IMS. The buffer memory 131 absorbs, for example, a delay of overlay processing in the overlay circuit 135.

The overlay circuit 135 performs the overlay processing on image data from the buffer memory 131. The overlay circuit 135 overlays predetermined image data on an overlay area for both the internal image data IMA and the input image data IMB. As an example, the predetermined image data is an icon indicating a state of a warning light of a vehicle, the vehicle where the electronic device 400 is mounted, such as an automobile, the electronic device 400, or an icon indicating information on an indicator provided at the vehicle. However, the predetermined image data is not limited thereto, and may be image data for displaying any display object. The overlay area is an area smaller than a size of the image and may be set at any position in the image. The overlay circuit 135 may perform the overlay processing on only one of the internal image data IMA and the input image data IMB. The overlay circuit 135 may make at least one of the overlay area and the predetermined image different between the internal image data IMA and the input image data IMB. Hereinafter, the image data after the overlay processing is also referred to as the internal image data IMA and the input image data IMB.

The synchronization signal generation circuit 133 generates a synchronization signal of the output image data IMQ. Specifically, the synchronization signal of the output image data IMQ is generated based on a dot clock used inside the circuit apparatus 100. The synchronization signal generation circuit 133 generates the synchronization signal of the output image data IMQ such that the output image data IMQ is output at the same frame rate as a frame rate of the image data received from the overlay circuit 135. Timings of the synchronization signal received by the synchronization signal generation circuit 133 and the synchronization signal of the output image data IMQ may be changed as long as the frame rate is the same. That is, the timing of the synchronization signal of the output image data IMQ may be a timing according to an image interface standard or the like of the output interface circuit 134, and may be different from the timing of the synchronization signal inside the circuit apparatus 100. Specifically, since the frame rate is determined by the total number of pixels in a frame, if the total number of pixels in the frame is maintained, the horizontal blanking period or the vertical blanking period may be changed.

The output interface circuit 134 uses the synchronization signal generated by the synchronization signal generation circuit 133 to output the internal image data IMA or the input image data IMB as the output image data IMQ. The output interface circuit 134 is an image interface circuit and performs conversion from the image data format used inside the circuit apparatus 100 to a transmission standard of the output image data IMQ. The image interface standard and the image data format used inside the circuit apparatus 100 are as described in the input circuit 120. However, the image interface standard of the output interface circuit 134 may be different from the image interface standard of the input circuit 120.

The control circuit 140 controls the synchronization signal generation circuit 133. Since the control circuit 140 controls the internal image data output circuit 190 and the selection circuit 150, a frame rate of an image received by the synchronization signal generation circuit 133 is known. The control circuit 140 outputs, to the synchronization signal generation circuit 133, frame rate information of the image received by the synchronization signal generation circuit 133 or timing information of a synchronization signal corresponding to the frame rate. The synchronization signal generation circuit 133 generates the synchronization signal of the output image data IMQ based on the frame rate information or the timing information of the synchronization signal from the control circuit 140.

The selection circuit 150 and the control circuit 140 in FIG. 2, and the overlay circuit 135 and the synchronization signal generation circuit 133 in FIG. 3 are implemented by a logic circuit. Each of the selection circuit 150, the control circuit 140, the overlay circuit 135, and the synchronization signal generation circuit 133 may be implemented as a separate logic circuit. Alternatively, the logic circuit may be a processor. The circuit apparatus 100 may include a memory that stores a program in which processing of each unit of the selection circuit 150, the control circuit 140, the overlay circuit 135, and the synchronization signal generation circuit 133 is described. The processor may implement the processing of each unit by executing the program. The processor may include, for example, one or a plurality of a CPU, a GPU, a microcomputer, a DSP, an ASIC, and an FPGA. The CPU is an abbreviation for a central processing unit. The GPU is an abbreviation for a graphics processing unit. The DSP is an abbreviation for a digital signal processor. The ASIC is an abbreviation for an application-specific integrated circuit. The FPGA is an abbreviation for a field-programmable gate array.

FIG. 4 is a timing chart showing an operation of the circuit apparatus. FIG. 4 shows an example in which the frame rate of the internal image data IMA whose frame rate is not adjusted and a frame rate of the input image data IMB are the same or substantially the same, and vertical synchronization timings are different.

Image data in each frame in the internal image data IMA is defined as IMA1, IMA2, . . . . The image data is transmitted in a manner of an active period and a vertical blanking period of IMA1, an active period and a vertical blanking period of IMA2, and so on. Similarly, image data in each frame in the input image data IMB is defined as IMB1, IMB2, . . . . The image data is transmitted in a manner of an active period and a vertical blanking period of IMB1, an active period and a vertical blanking period of IMB2, and so on.

A switching period TIMX is a period provided before switching from the internal image data IMA to the input image data IMB, and is a period in which frame rate adjustment of the internal image data IMA is performed. Specifically, the switching period TIMX is a period from when a first frame of the internal image data IMA after starting image switching is started to a timing when the selection circuit 150 switches from the internal image data IMA to the input image data IMB. The timing when the image switching is started may be received from the outside of the control circuit 140 or may be generated by the control circuit 140. The timing when the image switching is started may be any timing. As an example, in a case where the display system 300 operates according to a predetermined procedure when the display system 300 is powered on, reset, or restarted, the control circuit 140 starts the image switching when the predetermined procedure is an image switching step.

FIG. 4 shows an example in which the image switching is started before a frame in IMA2 is started. Before the switching period TIMX, the internal image data output circuit 190 outputs IMA1 in a normal frame period TFA. In the switching period TIMX, the internal image data output circuit 190 outputs IMA2, IMA3, and IMA4 in a frame period TFX longer than a frame period TFB of the input image data IMB. Accordingly, the frame rate of the internal image data IMA is lower than the frame rate of the input image data IMB. After the switching period TIMX, the internal image data output circuit 190 outputs IMA5 and IMA6 in the normal frame period TFA.

The selection circuit 150 selects the internal image data IMA before the switching period TIMX and during the switching period TIMX. In the switching period TIMX, since the frame rate of the internal image data IMA is lower than the frame rate of the input image data IMB, a time difference between the vertical synchronization timing of the internal image data IMA and the vertical synchronization timing of the input image data IMB is small. When a vertical blanking period of the internal image data IMA overlaps a vertical blanking period of the input image data IMB, the selection circuit 150 switches from the internal image data IMA to the input image data IMB in this overlap period. In the example in FIG. 4, switching is performed in an overlap period between a vertical blanking period between IMA4 and IMA5 in the internal image data IMA and a vertical blanking period between IMB5 and IMB6 in the input image data IMB.

The output circuit 130 outputs the image data selected by the selection circuit 150 without changing the frame rate. That is, when the selection circuit 150 selects the internal image data IMA, the output circuit 130 outputs IMA1 in the frame period TFA and outputs IMA2, IMA3, and IMA4 in the frame period TFX. When the selection circuit 150 selects the input image data IMB, the output circuit 130 outputs IMB6 and IMB7 in the frame period TFB.

As described above, in the output image data IMQ, the internal image data IMA and the input image data IMB are switched in the vertical blanking period. Accordingly, it is possible to provide the user with an image having high visual quality while avoiding distortion or a non-display period of the image when switching an asynchronous image.

In the embodiment, the circuit apparatus 100 includes the internal image data output circuit 190, the input circuit 120, the selection circuit 150, the output circuit 130, and the control circuit 140. The internal image data output circuit 190 outputs the internal image data IMA. The input circuit 120 receives the input image data IMB. The selection circuit 150 selects any of the internal image data IMA and the input image data IMB and outputs the selected image data IMS. The output circuit 130 outputs the output image data IMQ based on the selected image data IMS. The control circuit 140 controls the internal image data output circuit 190 to output the internal image data IMA at a frame rate different from that of the input image data IMB in the switching period TIMX from the internal image data IMA to the input image data IMB. The control circuit 140 controls the selection circuit 150 to switch from the internal image data IMA to the input image data IMB in the overlap period between the vertical blanking period of the internal image data IMA and the vertical blanking period of the input image data IMB.

According to the embodiment, in the switching period TIMX, the internal image data IMA is output at a frame rate different from that of the input image data IMB, and thus the time difference between the vertical synchronization timing of the internal image data IMA and the vertical synchronization timing of the input image data IMB is small. When the time difference is small, the overlap period between the vertical blanking period of the internal image data IMA and the vertical blanking period of the input image data IMB occurs. By switching from the internal image data IMA to the input image data IMB in this overlap period, switching between the internal image data IMA and the input image data IMB is performed in the vertical blanking period. Accordingly, it is possible to provide the user with an image having high visual quality while avoiding distortion or a non-display period of the image when switching an asynchronous image.

As described with reference to FIG. 4 and the like, the control circuit 140 may control the output circuit 130 to output the output image data IMQ at the frame rate of the internal image data IMA, which is set to be different from that of the input image data IMB in the switching period TIMX. The control circuit 140 may control the output circuit 130 to output the output image data IMQ at the frame rate of the input image data IMB after the switching period TIMX.

According to the embodiment, the output image data IMQ is output while the frame rate of the internal image data IMA and the frame rate of the input image data IMB in the selected image data IMS are maintained. In the selected image IMS, synchronization continuity is maintained by frame rate adjustment and image switching in the vertical blanking period. By outputting the output image data IMQ without changing the frame rate, the synchronization continuity is also maintained in the output image data IMQ.

As will be described later with reference to FIGS. 5 to 10, the control circuit 140 may set the frame rate of the internal image data IMA by adjusting a length of the vertical blanking period, a length of a horizontal blanking period, or the length of the vertical blanking period and the length of the horizontal blanking period of the internal image data IMA in the switching period TIMX.

The circuit apparatus 100 may include the register 180 that stores the adjustment data 181 for the frame rate of the internal image data IMA. The control circuit 140 may set the length of the vertical blanking period, the length of the horizontal blanking period, or the lengths of the vertical blanking period and the horizontal blanking period of the internal image data IMA based on the adjustment data 181 in the switching period TIMX.

The frame rate is determined by the total number of pixels in a frame including a blanking area. That is, (total number of horizontal pixels)×(total number of vertical pixels) is the total number of pixels in the frame. According to the embodiment, the total number of horizontal pixels is changed by adjusting the length of the horizontal blanking period, and the total number of vertical pixels is changed by adjusting the length of the vertical blanking period. Accordingly, the total number of pixels in the frame is changed, and the frame rate is adjusted.

Figure 6:
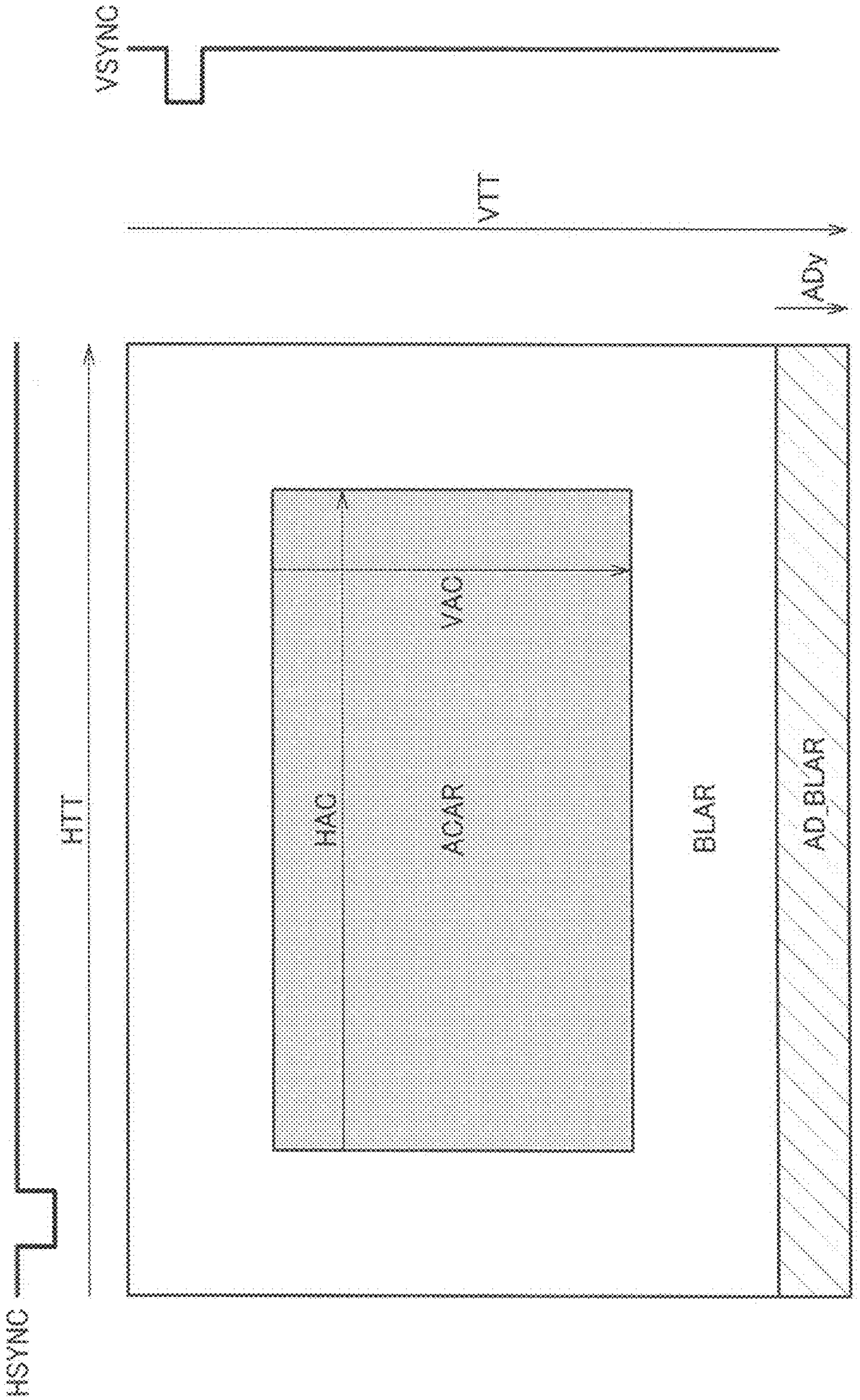
FIG. 6 shows a first example of frame rate adjustment.
Figure 7:
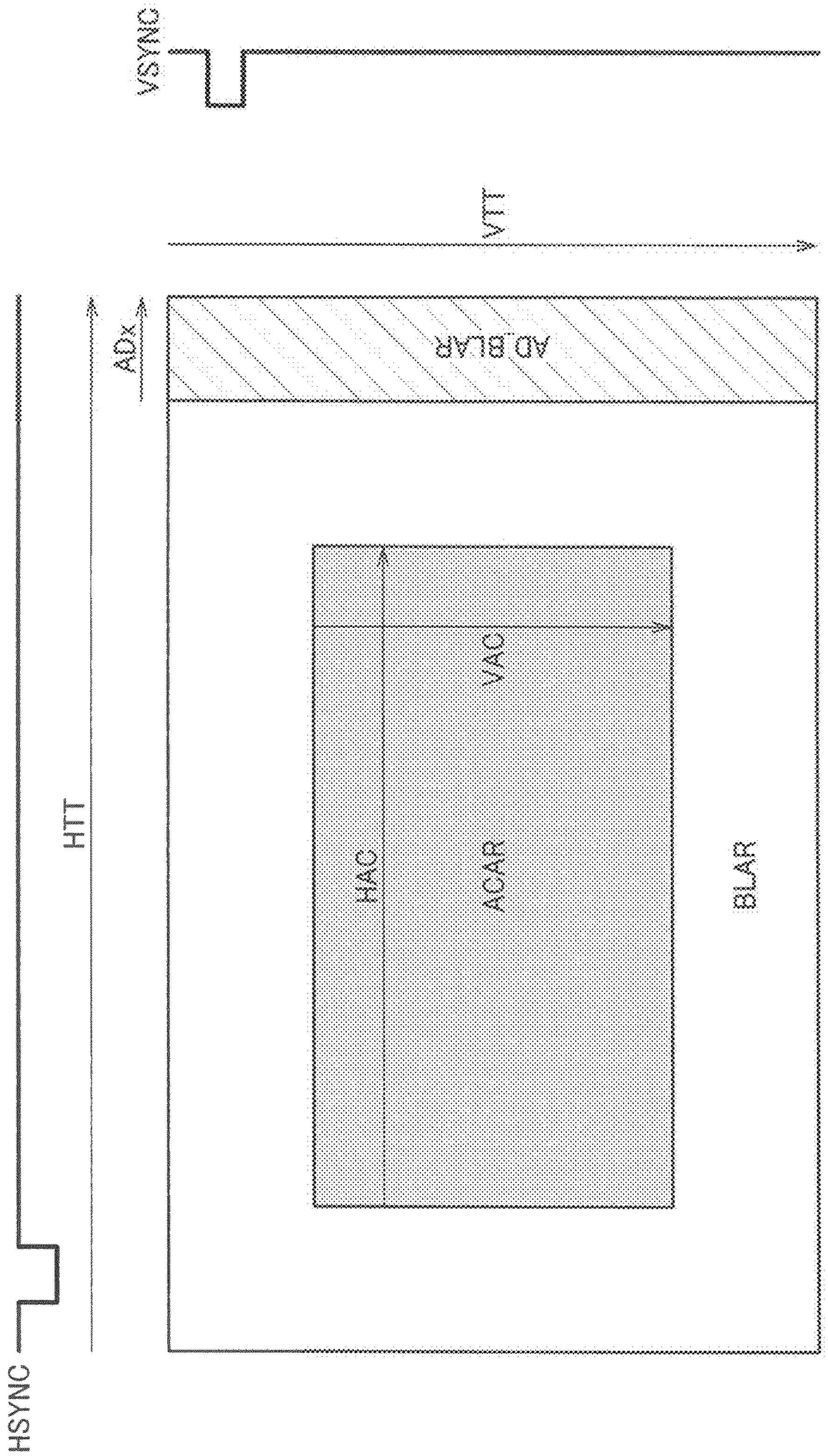
FIG. 7 shows a second example of the frame rate adjustment.
Figure 8:
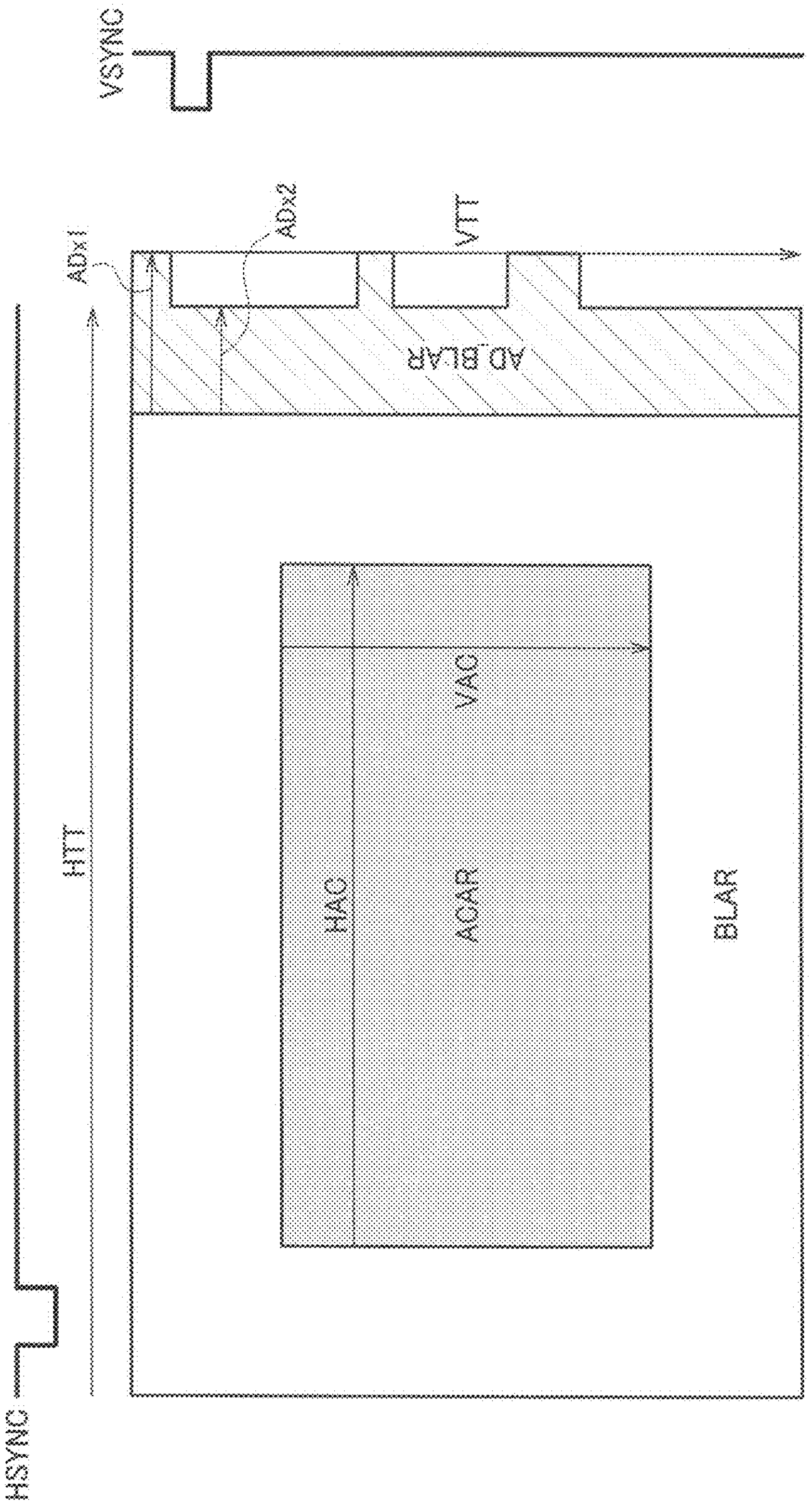
FIG. 8 shows a third example of the frame rate adjustment.
Figure 9:
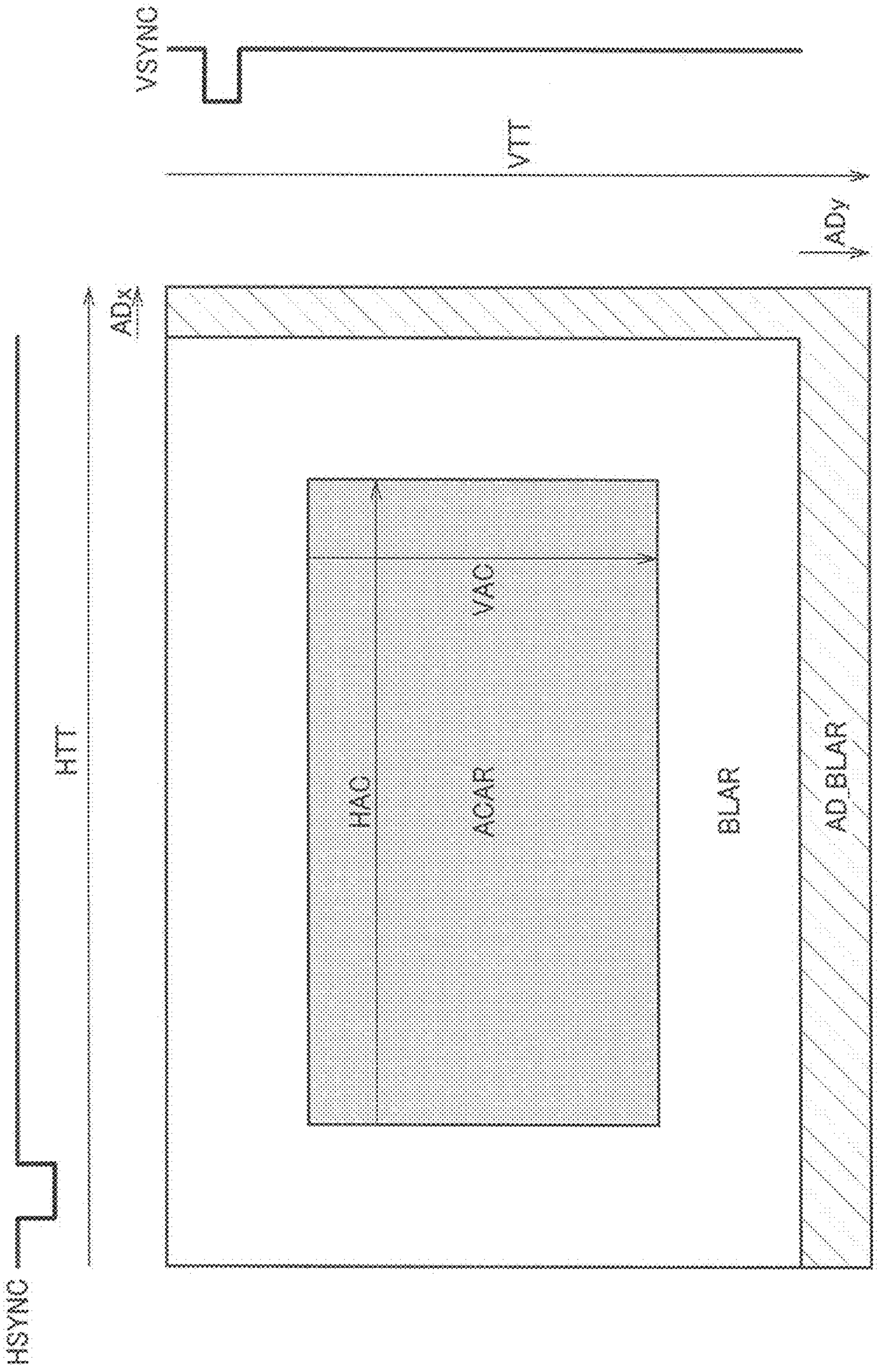
FIG. 9 shows a fourth example of the frame rate adjustment.
Figure 10:
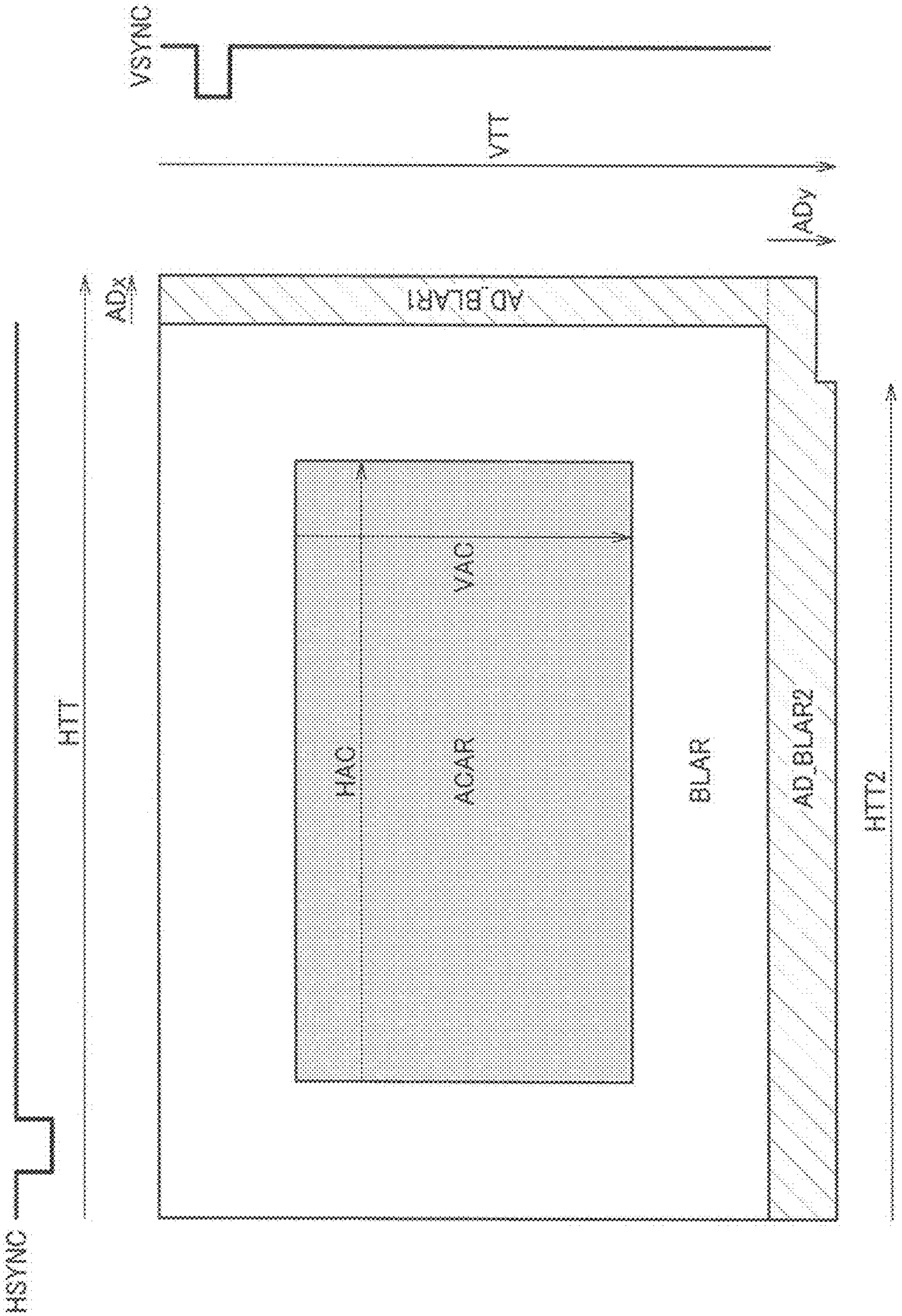
FIG. 10 shows a fifth example of the frame rate adjustment.

The length of the vertical blanking period is adjusted in FIG. 6, the length of the horizontal blanking period is adjusted in FIG. 7 and FIG. 8, and the length of the vertical blanking period and the length of the horizontal blanking period are adjusted in FIG. 9 and FIG. 10.

In the embodiment, the control circuit 140 may set the frame rate of the internal image data IMA to a frame rate lower than the frame rate of the input image data IMB in the switching period TIMX.

According to the embodiment, the vertical synchronization timing of the internal image data IMA gradually lags thus approaches the vertical and synchronization timing of the input image data IMB. When the time difference between the vertical synchronization timings is small, the overlap period between the vertical blanking period of the internal image data IMA and the vertical blanking period of the input image data IMB occurs.

In the embodiment, the internal image data IMA may be logo image data, icon image data, or black image data.

According to the embodiment, when switching from the logo image data, the icon image data, or the black image data to the asynchronous input image data IMB having a different display content, it is possible to provide the user with an image having high visual quality while avoiding distortion or a non-display period of the image.

In the embodiment, the output circuit 130 may include the overlay circuit 135 that overlays the predetermined image data on the overlay area in the output image data IMQ.

The overlay circuit 135 may overlay the predetermined image data on the overlay area both before and after switching from the internal image data IMA to the input image data IMB.

The internal image data IMA may be logo image data, icon image data, or black image data. The predetermined image data may be warning light image data.

According to the embodiment, it is possible to overlay the predetermined image data on the output image data IMQ and display the overlaid image data. By performing the overlay before and after the switching, the predetermined image data can be consistently overlaid and displayed before switching to the input image data IMB. For example, it is possible to always present an important display to the user. For example, at the time of startup of the display system 300, from when the logo image data, the icon image data, or the black image data is displayed, a warning light image can be consistently presented to the user after switching to the input image data IMB.

In the embodiment, the circuit apparatus 100 may include the register 180 that stores the adjustment data 181 for the frame rate of the internal image data IMA. The internal image data output circuit 190 may generate a timing control signal based on a frame rate setting from the control circuit 140 based on the adjustment data 181, and output the internal image data IMA based on the timing control signal.

According to the embodiment, the internal image data output circuit 190 can generate the timing control signal based on the frame rate setting from the control circuit 140 based on the adjustment data 181, and thus can output the internal image data IMA at a frame rate set based on the adjustment data 181 in the switching period TIMX.

In the embodiment, when the selection circuit 150 selects any of the internal image data IMA and the input image data IMB, the output circuit 130 may output the output image data IMQ based on a dot clock signal of the same frequency. "The output image data IMQ is output based on the dot clock signal of the same frequency" means, for example, that the output image data IMQ is output based on the same common dot clock signal regardless of what image data is selected.

According to the embodiment, when switching between the internal image data IMA and the input image data IMB, the output circuit 130 controls a display timing based on the dot clock signal of the same frequency. Accordingly, even when the internal image data IMA and the input image data IMB are asynchronous with each other, an image is switched in the vertical blanking period due to display timing control managed based on the dot clock signal of the same frequency in the output image data IMQ.

3. Frame Rate Adjustment

Hereinafter, examples of frame rate adjustment performed by the internal image data output circuit 190 will be described.

Figure 5:
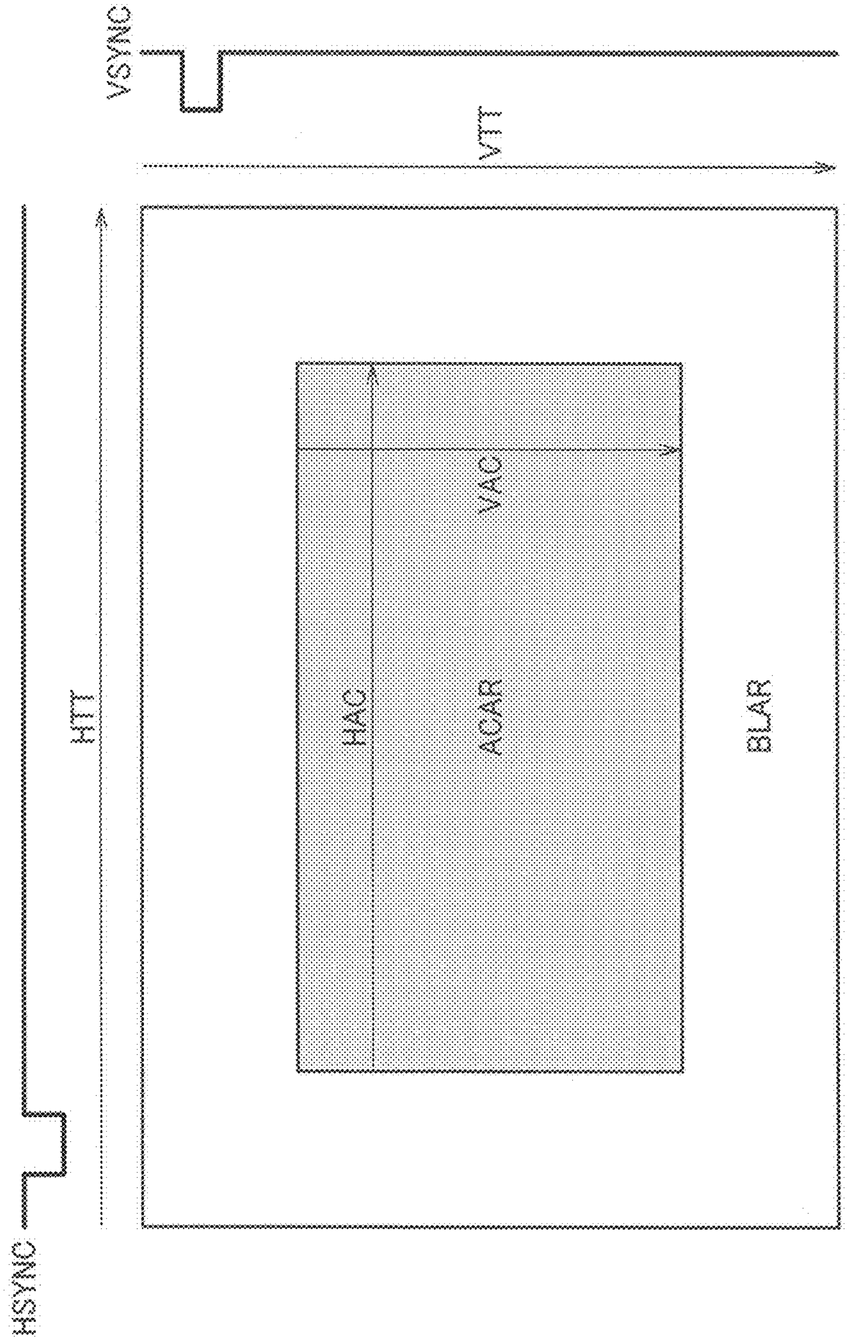
FIG. 5 shows an example of image data whose frame rate is not adjusted.

FIG. 5 shows an example of image data whose frame rate is not adjusted. HSYNC indicates a horizontal synchronization signal, and VSYNC indicates a vertical synchronization signal. Here, the image data is shown as two-dimensional data corresponding to a display state, HSYNC is shown in association with a horizontal scanning direction and VSYNC is shown in association with a vertical scanning direction in the display state. An area and a period of the two-dimensional data can be associated through a dot clock cycle. Hereinafter, the area and the period may be described without distinction.

An active area ACAR shown in FIG. 5 is an area displayed on the display apparatus 200. The number of horizontal active pixels HAC is the number of pixels in the active area ACAR in the horizontal scanning direction. The number of vertical active pixels VAC is the number of pixels in the active area ACAR in the vertical scanning direction.

A blanking area BLAR is an area other than the active area ACAR among all areas corresponding to a frame, and includes a horizontal blanking period and a vertical blanking period. The horizontal blanking period is a period other than an active period in a horizontal scanning period in which the active area ACAR exists. The vertical blanking period is a period in which the active area ACAR does not exist in a vertical scanning period. The total number of horizontal pixels HTT is the number of pixels in the horizontal scanning direction in all areas including the blanking area BLAR and the active area ACAR. The total number of vertical pixels VTT is the number of pixels in the vertical scanning direction in all areas including the blanking area BLAR and the active area ACAR.

FIG. 6 is a first example of the frame rate adjustment. The internal image data output circuit 190 decreases the frame rate of the internal image data IMA in the switching period TIMX by increasing the total number of vertical pixels VTT.

AD_BLAR indicates an increment in the blanking area BLAR. The number of pixels of the increment AD_BLAR in the horizontal scanning direction is the total number of horizontal pixels HTT. When the number of pixels of the increment AD_BLAR in the vertical scanning direction is referred to as ADy, the vertical scanning period is increased by HTT×ADy×(dot clock cycle). Accordingly, the frame rate decreases.

The adjustment data 181 may be, for example, data indicating the total number of vertical pixels VTT or data indicating the number of pixels ADy of the increment AD_BLAR in the vertical scanning direction.

FIG. 7 is a second example of the frame rate adjustment. The internal image data output circuit 190 decreases the frame rate of the internal image data IMA in the switching period TIMX by increasing the total number of horizontal pixels HTT.

The number of pixels of the increment AD_BLAR in the vertical scanning direction is the total number of vertical pixels VTT. When the number of pixels of the increment AD_BLAR in the horizontal scanning direction is referred to as ADx, the vertical scanning period is increased by ADx×VTT×(dot clock cycle). Accordingly, the frame rate decreases.

The adjustment data 181 may be, for example, data indicating the total number of horizontal pixels HTT or data indicating the number of pixels ADx of the increment AD_BLAR in the horizontal scanning direction.

FIG. 8 is a third example of the frame rate adjustment. The internal image data output circuit 190 increases the total number of horizontal pixels HTT and combines a plurality of total numbers of horizontal pixels HTT to decrease the frame rate of the internal image data IMA in the switching period TIMX.

The number of pixels of the increment AD_BLAR in the vertical scanning direction is the total number of vertical pixels VTT. The number of pixels of the increment AD_BLAR in the horizontal scanning direction differs in each horizontal scanning period. In the example in FIG. 8, the number of pixels of the increment AD_BLAR in each horizontal scanning period is ADx1 or ADx2. ADx1 and ADx2 are different. However, the number of pixels of the increment AD_BLAR in each horizontal scanning period may be any of three or more numbers of pixels. Since the vertical scanning period increases by (total number of pixels of AD_BLAR)×(dot clock cycle), the frame rate decreases. By combining the plurality of total numbers of horizontal pixels HTT, the frame rate can be finely adjusted as compared to FIG. 6 and FIG. 7.

The adjustment data 181 may be, for example, data indicating the total number of horizontal pixels HTT in each horizontal scanning period, or data indicating the number of pixels of the increment AD_BLAR in the horizontal scanning direction in each horizontal scanning period.

FIG. 9 is a fourth example of the frame rate adjustment. The internal image data output circuit 190 decreases the frame rate of the internal image data IMA in the switching period TIMX by increasing the total number of horizontal pixels HTT and the total number of vertical pixels VTT.

The number of pixels of the increment AD_BLAR in the horizontal scanning direction is ADx, and the number of pixels of the increment AD_BLAR in the vertical scanning direction is ADy. Since the vertical scanning period increases by HTT×VTT−{(HTT−ADx)×(VTT−ADy)}×(dot clock cycle), the frame rate decreases.

The adjustment data 181 may be, for example, data indicating the total number of horizontal pixels HTT and the total number of vertical pixels VTT, or may be data indicating the number of pixels ADx of the increment AD_BLAR in the horizontal scanning direction and the number of pixels ADy of the increment AD_BLAR in the vertical scanning direction.

FIG. 10 is a fifth example of the frame rate adjustment. The internal image data output circuit 190 increases the total number of horizontal pixels HTT and the total number of vertical pixels VTT and combines a plurality of total numbers of horizontal pixels HTT to decrease the frame rate of the internal image data IMA in the switching period TIMX.

AD_BLAR1 and AD_BLAR2 indicate the increment of the blanking area BLAR. AD_BLAR1 is an area corresponding to an increase in the total number of horizontal pixels HTT. The number of pixels of the increment AD_BLAR1 in the horizontal scanning direction is ADx. AD_BLAR2 is an area corresponding to an increase in the total number of vertical pixels VTT. The number of pixels of the increment AD_BLAR2 in the vertical scanning direction is ADy. However, a horizontal scanning period in which the total number of horizontal pixels is HTT and a horizontal scanning period in which the total number of horizontal pixels is HTT2 co-exist in the increment AD_BLAR2. FIG. 12 shows an example in which the total number of horizontal pixels is HTT2 in a last horizontal scanning period. Here, HTT2<HTT. FIG. 12 shows example in which HTT−HTT2>ADx, and alternatively, HTT−HTT2≤ADx may be satisfied.

The adjustment data 181 may be, for example, data indicating the total number of horizontal pixels HTT, the total number of vertical pixels VTT, and the total number of horizontal pixels HTT2 in the last horizontal scanning period. Alternatively, the adjustment data 181 may be data indicating the number of pixels ADx of the increment AD_BLAR in the horizontal scanning direction, the number of pixels ADy of the increment AD_BLAR in the vertical scanning direction, and the total number of horizontal pixels HTT2 in the last horizontal scanning period.

Although the embodiment is described in detail above, those skilled in the art could easily understand that many modifications are possible without substantially departing from the novel matters and the effects of the present disclosure. Therefore, all such modifications are included in the scope of the present disclosure. For example, a term described at least once together with a different term having a broader meaning or the same meaning in the specification or the drawings can be replaced with the different term at any place in the specification or the drawings. All combinations of the embodiment and the modifications are also included in the scope of the present disclosure. The configurations and operations of the electronic device, the display system, the display apparatus, the circuit apparatus, the image output apparatus, the input circuit, the internal image data output circuit, the memory, the selection circuit, the output circuit, the control circuit, and the register are not limited to those described in the embodiment, and various modifications can be made.

What is claimed is:

1. A circuit apparatus comprising:

an internal image data output circuit configured to output internal image data;

an input circuit configured to receive input image data;

a selection circuit configured to select any of the internal image data and the input image data, and output selected image data;

an output circuit configured to output output image data based on the selected image data;

an overlay circuit configured to overlay predetermined image data on an overlay area in the output image data; and a control circuit configured to:

control the internal image data output circuit to output the internal image data at a frame rate different from a frame rate of the input image data in a switching period from the internal image data to the input image data; and control the selection circuit to switch from the internal image data to the input image data in an overlap period between a vertical blanking period of the internal image data and a vertical blanking period of the input image data, wherein a frame rate of the predetermined image data is the same as a frame rate of the output image data.

2. The circuit apparatus according to claim 1, wherein the control circuit is further configured to:

control, in the switching period, the output circuit to output the output image data at the frame rate of the internal image data, which is set to be different from the frame rate of the input image data; and control, after the switching period, the output circuit to output the output image data at the frame rate of the input image data.

3. The circuit apparatus according to claim 1, wherein the control circuit is further configured to set the frame rate of the internal image data by adjusting a length of the vertical blanking period, a length of a horizontal blanking period, or the length of the vertical blanking period and the length of the horizontal blanking period of the internal image data in the switching period.

4. The circuit apparatus according to claim 3, further comprising:

a register configured to store adjustment data for the frame rate of the internal image data, wherein the control circuit is further configured to set the length of the vertical blanking period, the length of the horizontal blanking period, or the lengths of the vertical blanking period and the horizontal blanking period of the internal image data based on the adjustment data in the switching period.

5. The circuit apparatus according to claim 1, wherein the control circuit is further configured to set the frame rate of the internal image data to a frame rate lower than the frame rate of the input image data in the switching period.

6. The circuit apparatus according to claim 1, wherein the internal image data is logo image data, icon image data, or black image data.

7. The circuit apparatus according to claim 1, wherein the output circuit includes the overlay circuit.

8. The circuit apparatus according to claim 1, wherein the overlay circuit overlays the predetermined image data on the overlay area before and after switching from the internal image data to the input image data.

9. The circuit apparatus according to claim 8, wherein the internal image data is logo image data, icon image data, or black image data, and the predetermined image data is warning light image data.

10. The circuit apparatus according to claim 1, further comprising:

a register configured to store adjustment data for the frame rate of the internal image data, wherein the internal image data output circuit is further configured to generate a timing control signal based on a frame rate setting from the control circuit based on the adjustment data, and output the internal image data based on the timing control signal.

11. The circuit apparatus according to claim 1, wherein when the selection circuit selects any of the internal image data and the input image data, the output circuit outputs the output image data based on a dot clock signal of the same frequency.

12. A display system comprising:

the circuit apparatus according to claim 1; and a display apparatus configured to display an image based on the output image data.

* * * * *